(12) United States Patent
Bierich et al.

(10) Patent No.: US 6,713,690 B2
(45) Date of Patent: Mar. 30, 2004

(54) ANALYTICAL BALANCE HAVING A CONNECTING PART BETWEEN THE HOUSING AND THE DISPLAY AND OPERATING UNIT

(75) Inventors: Eduard Bierich, Hann-Muenden (DE); Guenter Boetcher, Bovenden (DE); Michael Laubstein, Goettingen (DE); Joerg Peter Martens, Bovenden (DE); Juergen Winkelbach, Friedland (DE)

(73) Assignee: Sartorius Aktiengesellschaft, Goettingen (DE)

( * ) Notice: Subject to any disclaimer, the term of this patent is extended or adjusted under 35 U.S.C. 154(b) by 0 days.

(21) Appl. No.: 10/218,571

(22) Filed: Aug. 15, 2002

(65) Prior Publication Data

US 2003/0051926 A1 Mar. 20, 2003

Related U.S. Application Data

(63) Continuation of application No. PCT/EP01/02041, filed on Feb. 23, 2001.

(30) Foreign Application Priority Data

Mar. 2, 2000 (DE) ..................................... 200 04 005 U

(51) Int. Cl.[7] .............................................. G01G 21/28
(52) U.S. Cl. ....................................... 177/180; 177/238
(58) Field of Search ................................. 177/180, 181, 177/182, 238, 239, 240, 241, 242, 243, 244

(56) References Cited

U.S. PATENT DOCUMENTS

| 4,401,176 | A | * | 8/1983 | Knothe et al. | 177/180 |
| 4,666,005 | A | * | 5/1987 | Komoto et al. | 177/180 |
| 4,858,711 | A | | 8/1989 | Kunz | 177/212 |
| 5,617,648 | A | * | 4/1997 | Leisinger et al. | 177/180 |
| 5,869,788 | A | * | 2/1999 | Gordon et al. | 177/180 |
| 6,504,112 | B1 | * | 1/2003 | Luebke et al. | 177/180 |

FOREIGN PATENT DOCUMENTS

| DE | 35 08 873 C1 | 6/1986 |
| DE | 39 39 959 A1 | 6/1990 |

* cited by examiner

*Primary Examiner*—Randy Gibson
(74) *Attorney, Agent, or Firm*—Sughrue Mion, PLLC

(57) ABSTRACT

An electronic balance including a housing (1), a weighing scale (2), a windshield (3), which preferably at least partially surrounds the weighing scale, and a display and operating unit (4) which is connected to the balance housing. The connecting part (5) between the display and operating unit (4) and the housing (1) consists essentially of a material with poor heat conduction properties. At least one vertical radiation protection plate (6) is provided between the display and operating unit (4) and the housing (1), and the connecting part (5) is configured in such a way as to impair air convection on both sides of the radiation protection plate(s) (6) preferably to the least extent possible. This results in excellent thermal decoupling between the display and operating unit (4) and the housing (1).

17 Claims, 2 Drawing Sheets

ANALYTICAL BALANCE HAVING A CONNECTING PART BETWEEN THE HOUSING AND THE DISPLAY AND OPERATING UNIT

This is a Continuation of International Application PCT/EP01/02041, with an international filing date of Feb. 23, 2001, which was published under PCT Article 21(2) in German, and the disclosure of which is incorporated into this application by reference.

FIELD OF AND BACKGROUND OF THE INVENTION

The invention relates to an electronic balance. More particularly, the invention relates to an electronic balance that has a housing, a weighing scale, a windshield which at least partially surrounds the weighing scale, and a display and operating unit which is connected with the balance housing.

Balances of this type are generally known and are described, for instance, in German Patent reference DE 35 08 873.

A drawback of this known embodiment is that the heat generated in the display and operating unit can freely penetrate into the balance housing. The same applies to the pivotable display and operating unit described in German Patent document DE 39 39 959. There, too, the heat can flow directly via a swivel arm into the balance housing and the weighing space surrounded by the windshield, since, for stability reasons, the swivel arm is generally made of metal.

To circumvent this heat problem, it is further generally known to accommodate the display and operating unit in a separate housing from the rest of the balance and to connect it only with a data cable. This solution is ideal with respect to heat transfer, provided that the operator of the balance leaves a sufficiently large space between the display and operating unit and the rest of the balance, but it has the drawback of requiring additional plugs and cable connections and complicating handling when the balance has to be moved to another site.

OBJECTS OF THE INVENTION

Thus, one object of the invention is to provide a balance of the type described above, in which the display and operating unit is connected directly with the balance and which nevertheless suppresses heat transfer from the display and operating unit to the rest of the balance as much as possible.

SUMMARY OF THE INVENTION

According to one formulation, the invention is directed to an electronic balance that includes: a housing; a weighing scale; a windshield that at least partially surrounds the weighing scale; a display and operating unit which is connected with the housing; a connecting part between the display and operating unit and the housing that consists essentially of a material with poor heat conduction properties; and at least one vertical radiation protection plate provided between the display and operating unit and the housing.

Aspects of the invention thus include making the connecting part between the display and operating unit and the housing of a material with poor heat conduction properties, providing at least one vertical radiation protection plate between the display and operating unit and the housing, and configuring the connecting part between the display and operating unit and the housing in such a way that air convection on either sides of the radiation protection plate(s) is impaired as little as possible.

Thus, if all of the inventive aspects are used in combination, not only is heat conduction between the display and operating unit and the housing reduced, but heat radiation is also shielded, and cooling of the radiation protection plate(s) is made possible by air convection. It should be noted, however, that the invention encompasses a wide range of embodiments, in which, inter alia, any of the inventive aspects are used either alone or in any combination with other aspects of the invention.

BRIEF DESCRIPTION OF THE DRAWINGS

The invention in its various aspects, along with advantageous embodiments, will now be described with reference to the schematic figures in which.

DETAILED DESCRIPTION OF THE PREFERRED EMBODIMENTS

Figure 1:
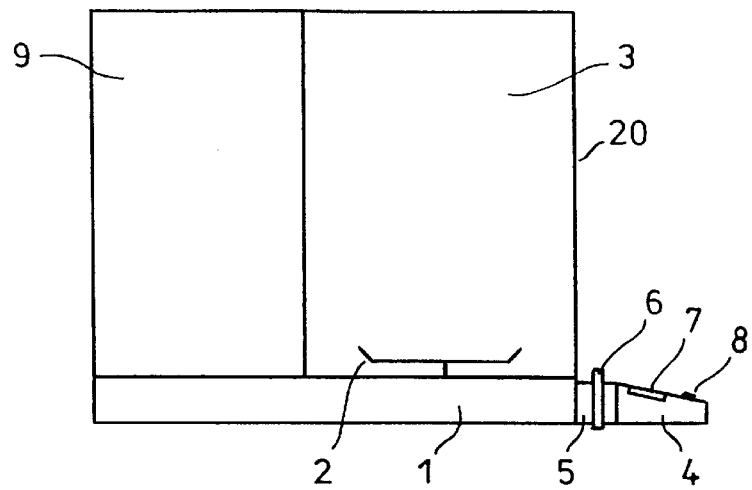
FIG. 1 is a side view of a first embodiment of the balance.

The outline drawing of FIG. 1 shows a base plate 1 of the balance housing, a weighing scale 2, a windshield 3, which preferably surrounds the weighing scale, and a display and operating unit 4. A display 7 and an operator button 8 are indicated on the display and operating unit 4. Behind windshield 3 is a housing area 9, which accommodates, for instance, the electronics of the balance.

Figure 3:
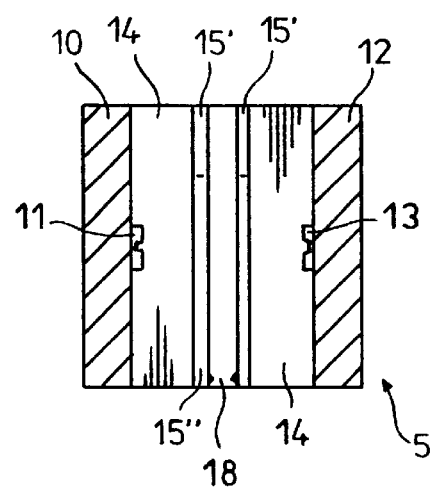
FIG. 3 is a section through the connecting part taken along the dash-dotted line III—III in FIG. 2.
Figure 2:
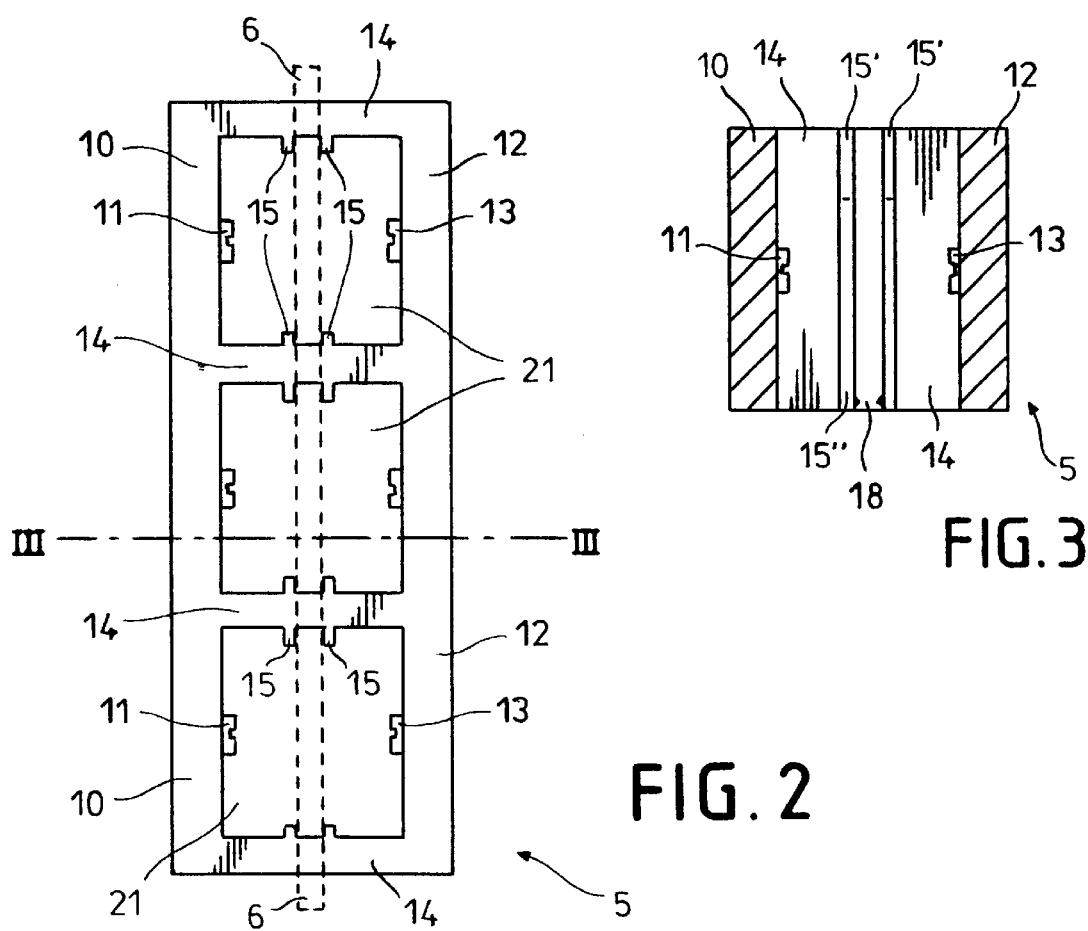
FIG. 2 is a top view of the connecting part between the display and operating unit and the rest of the balance.
Figure 4:
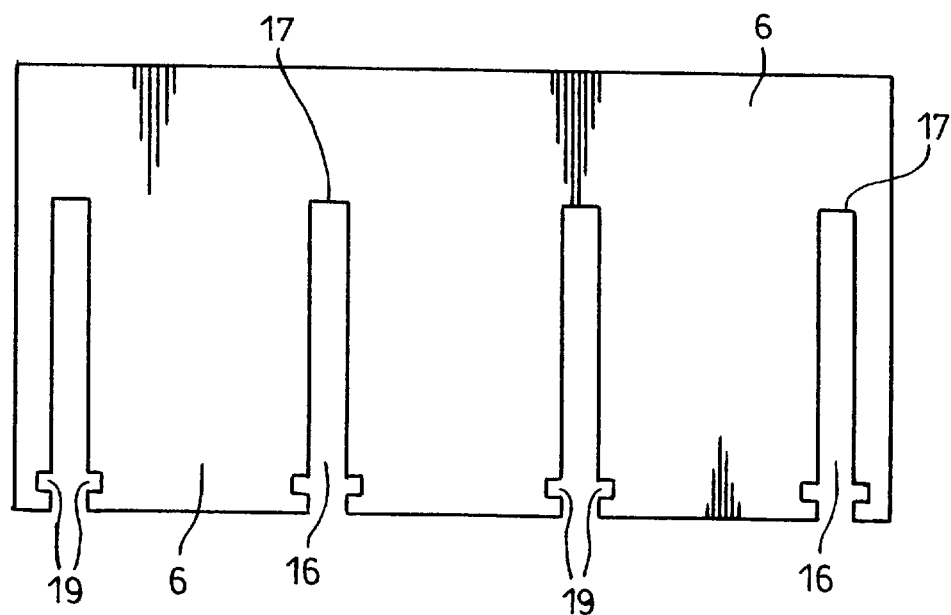
FIG. 4 shows a radiation protection plate alone.

The connection between the display and operating unit 4 and the housing base plate 1 is provided by a connecting part 5, which is shown in FIG. 2 in an enlarged top view and in FIG. 3 in a likewise enlarged section taken along the dash-dotted line III—III in FIG. 2. FIG. 1 further shows a radiation protection plate 6, which is also shown in FIG. 2 as a dash-dotted line and again in FIG. 4 alone as an enlargement.

The connecting part 5 is made of a material with poor heat conduction properties, e.g. plastic. On its left side (in FIGS. 1–3) it is provided with a continuous plate 10, which is fixed to the base plate of the housing by means of screws 11. On its right side (in FIGS. 1–3), connecting part 5 is provided with a likewise continuous plate 12, which is fixed to the display and operating unit 4 by means of screws 13. The two plates 10 and 12 are interconnected by vertical connecting segments 14. The number and thickness of these connecting segments 14 is just large enough to obtain the mechanically required strength values of the connection between the display and operating unit 4 and the base plate 1 of the housing. This keeps heat conduction between the display and operating unit and the base plate of the housing as low as possible.

The connecting segments 14 each have two small vertical ribs 15, which are approximately centered between plates 10 and 12. Between these ribs, a radiation protection plate 6, which is indicated by a dashed line in FIG. 2 and again depicted alone in FIG. 4, can be inserted from the top. For the sake of clarity, the radiation protection plate is not shown in FIG. 3. Ribs 15 laterally guide and retain the radiation protection plate. Radiation protection plate 6 is furthermore provided with slots 16, which are dimensioned such that they laterally enclose the connecting segments 14 with little play. The respective upper ends 17 of the slots act as a stop when the radiation protection plate is inserted from the top and rests on the upper side of the connecting segments 14. Ribs 15 are flexible in their lower area 15" as indicated in FIG. 3. Only the upper area 15' of the ribs is fixedly connected with the respective connecting segment 14; the lower area 15" can flexibly yield. A small projection 18 in the lower area 15", in interaction with a respective recess 19 on slots 16, ensures that radiation protection plate 6 snaps into place such that it can only be pulled upwardly and out of connecting part 5 after overcoming the interlocking resistance.

Radiation protection plate 6 serves to keep away the heat radiated by display and operating unit 4 from the lower part of weighing space 3 and weighing scale 2. The radiation protection plate reflects a portion of the radiated heat and absorbs the rest. To minimize absorption and thus heating of radiation protection plate 6 as far as possible, the plate advantageously has a substantial capacity to reflect radiated heat. This is accomplished, for instance, by making the radiation protection plate of metal with a bright surface. An aluminum plate, for example, is well suited as a radiation protection plate. It is also possible, however, to make the radiation protection plate of plastic with a metallized surface.

A heat reflective coating on the front shield 20 of the windshield supports the effect of radiation protection plate 6. An indium and tin oxide coating, which is transparent in the visible radiation spectrum, is advantageously used for this purpose. This coating at least partially reflects the heat radiated from the display and operating unit 4 that reaches the front shield 20 over the upper edge of radiation protection plate 6, thereby preventing this heat from heating up the weighing space 3. Heat radiation that occurs on the rear side of the radiation protection plate 6 is also partially reflected by this reflective coating and thus does not contribute to heating the weighing space 3.

Radiation protection plate 6 does not necessarily have to be so large that no direct heat radiation from display and operating unit 4 reaches front shield 20 of windshield 3. It is sufficient if the lower area of front shield 20, i.e., the lower area of weighing space 3, is protected. For it is precisely the over-temperature of the air in the lower area of the weighing space that interferes with the weighing results, since this causes unstable air layers. In contrast, a slight over-temperature in the upper area of the weighing space results in thermally stable air layers and is consequently more favorable for weighing than a constant distribution of the temperature.

The over-temperature experienced by the radiation protection plate 6, which is created by partial absorption of the incident heat radiation, is kept low because the radiation protection plate acts as a heat sink. To avoid disturbing the free convection of air to the extent possible, the connecting part 5 is provided with large openings 21 between the connecting segments 14, such that the air can rise almost unhindered on both sides of radiation protection plate 6 and can thereby cool the radiation protection plate.

Figure 5:
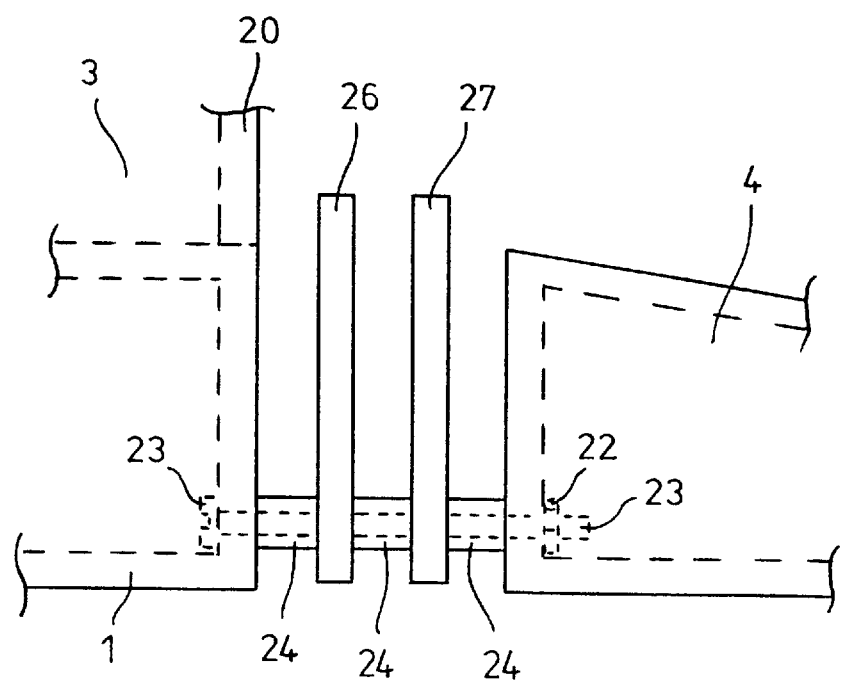
FIG. 5 is a side view of a pertinent part of a second embodiment of the balance.

A second embodiment of the balance is shown in FIG. 5. Only the connection essential to the invention between the display and operating unit and the rest of the balance is shown. The display and operating unit 4 is connected with base plate 1 of the balance by at least two screws 23 provided with spacer tubes 24. Two vertical radiation plates 26 and 27 are held between the spacer tubes 24. Many different mechanical design variants are possible: for instance, instead of screws 23 with nuts 22 (as shown in FIG. 5) it is also possible to use a threaded rod with a nut on either side or a rod that is only provided with a thread at its two ends. The spacer tubes 24 can be placed onto the screws or rods as separate tubes but can also form an integral component of the rods. Likewise, the radiation protection plates 26 and 27 can be provided with only one hole each per continuous screw 23 or continuous rod, such that the radiation protection plates are firmly connected with the balance after installation. Instead, they can be provided with vertical slots so that they can be removed in upward direction, as provided for in the first embodiment according to FIGS. 1 to 4. The use of two radiation protection plates 26 and 27 has the advantage that heat radiation which also occurs on the rear side of the heat protection plate 27 due to the over-temperature of the radiation protection plate does not directly strike front shield 20 of the windshield and base plate 1 of the balance housing but first strikes radiation plate 26 instead. Only the heat radiated on the rear side of radiation protection plate 26 strikes front shield 20 and base plate 1 of the balance housing. The over-temperature of radiation protection plate 26 is substantially lower, however, than the over-temperature of radiation protection plate 27, such that the amount of heat radiation striking front shield 20 is correspondingly lower.

This embodiment with two radiation protection plates is of course also possible for the first configuration according to FIGS. 1 to 4. The connecting segments 14 would simply have to be designed slightly longer and be provided with ribs 15 for two radiation protection plates.

The over-temperatures discussed above are over-temperatures of at maximum a few degrees Kelvin (K). Due to the high sensitivity of the analytical balance, these slight temperature differences have a noticeable effect on the weighing result so that the described heat protection measures are appropriate and important.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Electronic balance comprising:

a housing;

a weighing scale;

a windshield that at least partially surrounds the weighing scale;

a display and operating unit which is connected with the housing;

a connecting part between the display and operating unit and the housing that consists essentially of a material with poor heat conduction properties; and at least one vertical radiation protection plate provided between the display and operating unit and the housing.

2. Electronic balance as claimed in claim 1, wherein the connecting part between the display and operating unit and the housing is configured to permit air convection on either side of the radiation protection plate.

3. Electronic balance as claimed in claim 1, wherein the radiation protection plate is removably fixed to the connecting part between the display and operating unit and the housing.

4. Electronic balance as claimed in claim 1, wherein the radiation protection plate comprises vertical slots that receive and removably affix to the connecting part.

5. Electronic balance as claimed in claim 1, wherein the radiation protection plate consists essentially of metal.

6. Electronic balance as claimed in claim 1, wherein the radiation protection plate between the display and operating unit and the housing consists essentially of metallized plastic.

7. Electronic balance as claimed in claim 2, wherein the connecting part between the display and operating unit and the housing is a molded plastic part provided with air passage openings.

8. Electronic balance as claimed in claim 3, wherein the connecting part comprises flexible ribs configured to hold the radiation protection plate.

9. Electronic balance as claimed in claim 1, wherein the connecting part between the display and operating unit and the housing comprises at least two rods and spacers that are configured to hold the radiation protection plate.

10. Electronic balance as claimed in claim 9, wherein the rods are screws.

11. Electronic balance as claimed in claim 1, wherein the windshield comprises a front shield having a heat reflective surface coating.

12. Electronic balance as claimed in claim 1, wherein a second vertical radiation protection plate is provided between the housing and the display and operating unit.

13. Electronic balance comprising:

a weighing scale;

a housing for said weighing scale, said housing including a windshield for said weighing scale;

a display and a keypad; and a connecting part, other than a cable, that mechanically connects said housing and said display and keypad and that impedes transmission of heat between said housing and said display and keypad.

14. Electronic balance according to claim 13, wherein said connecting part rigidly connects said housing and said display and keypad.

15. Electronic balance as claimed in claim 13, wherein said connecting part between the display and operating unit and the housing is configured to permit air convection through said connecting part.

16. Electronic balance comprising:

a weighing scale;

a housing for said weighing scale, said housing including a windshield for said weighing scale;

a display and a keypad; and at least one radiation protection plate that is interposed between said housing and said display and keypad and that impedes transmission of heat between said housing and said display and keypad.

17. Electronic balance as claimed in claim 16, wherein said radiation protection plate is configured and positioned to permit mutually segregated air convection on either side of said radiation protection plate.

* * * * *